O. W. STOW.
Machine for Bending Sheet Metal.
No. 3,069. Reissued Aug. 4, 1868.
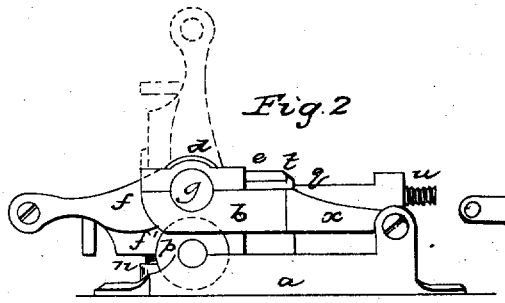
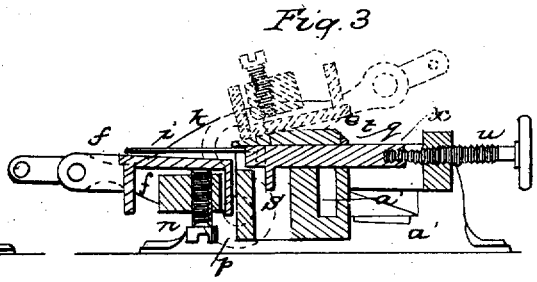
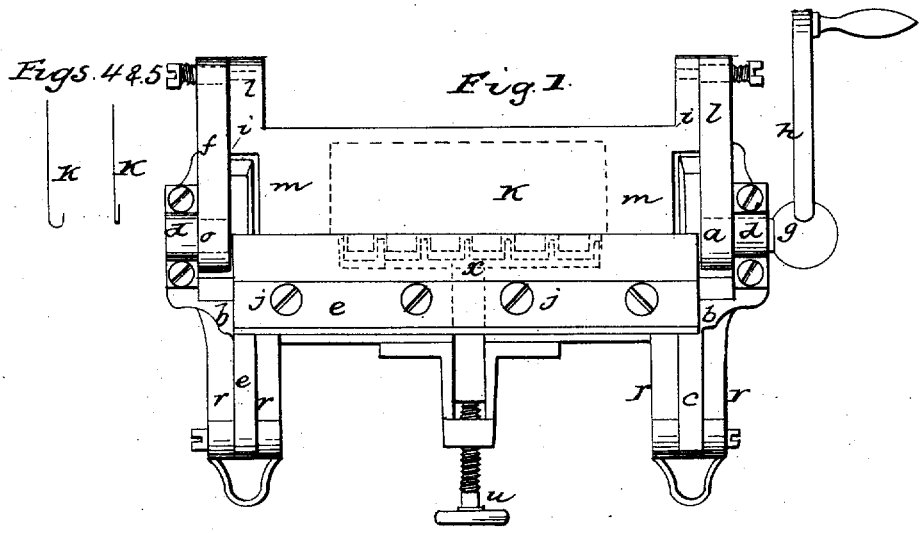
WITNESSES
Geo. W. Hall
Chas. A. Pettit
INVENTOR
Orson W. Stow
per Munn & Co
Attorneys
N. PETERS, Photo-Lithographer, Washington, D. C.

UNITED STATES PATENT OFFICE.

ORSON W. STOW, OF PLANTSVILLE, CONNECTICUT.

IMPROVEMENT IN MACHINES FOR BENDING SHEET METAL.

Specification forming part of Letters Patent No. 27,319, dated February 28, 1860; Reissue No. 3,069, dated August 4, 1868.

*To all whom it may concern:*

Be it known that I, ORSON W. STOW, of Plantsville, county of Hartford, and State of Connecticut, have invented certain new and useful Improvements in Machines for Bending Sheet Metal; and I do hereby declare that the same are described and represented in the following specification and drawings; and to enable others skilled in the art to make and use the same, I will proceed to describe its construction and operation, referring to the drawings, in which the same letters indicate like parts in each of the figures.

This improvement consists, first, in making the folding bar commonly used in such machines in two parts, one part being adjustable in respect to the folding plate by means of set-screws or other equivalent means, so as to form a close or open lock for joining two pieces of metal plate or closing around a wire; and, second, it consists in arranging the gripping-jaw with the folding bar in such a manner that on motion being given to the folding bar on its axis the gripping-jaw is made to close on the folding plate, and at the same time to carry along with it the folding bar into such a position as will bring its axis of motion nearly into a line with the edge of the folding plate, thereby placing the folding bar in position to be turned over on the folding plate, and this necessarily and simultaneously with the motion of the folding bar on its axis.

The object of the first part of my improvement is to enable the operator with one and the same machine to form close locks for joining metal plates, and also to form locks or bends for closing around a wire, and by means of the adjustability of the parts forming bends to fit any size wire.

The object of the second part of my improvement is to utilize and simplify the machine for a more convenient use in the hands of inexperienced workmen by uniting its parts together in such a manner as to harmonize its action.

In the accompanying drawings, Figure 1 is a top view. Fig. 2 is a side elevation. Fig. 3 is a longitudinal vertical section. Figs. 4 and 5 are representations of the "open" and "close" locks used in manufacturing articles from sheet metal.

*a a* are foot-pieces attached to the end and at right angles with the cross-bar *a'*, forming a bed-plate, by which the machine may be secured to any desired place for use, and upon which the mechanism is supported and operated. In one end of said bed-plate apertures and bearings are made, in which are placed friction-wheels *p*. On the other end of the bed-plate, at *c*, hinge-projections *r r* are formed, in which, by means of screws or other suitable fastenings, the ends of the arms of the frame *b* are secured. The folding plate *e*, of the usual shape, is secured upon the top edge of the cross-bar *a'* and against the shoulder *q*, on the back edge of the cross-bar, by means of screws *j j*.

*b* is a frame hinged to the bed-plate by screws at *c*, and having journal-boxes *d d* on each end. The part S of this frame *b*, otherwise called a "cross-bar," *s*, forms a gripping-jaw with the folding plate *e*, between which jaw *s* and plate *e* the sheet metal *k* is held fast while the bend is made. In the upper edge of the cross-bar or jaw *s* of the frame *b* may be formed slits, as shown by the dotted lines of Fig. 1, in which the gage *x* is fitted and works back and forth by means of a right-and-left-hand screw, *u*.

*f* is a frame having journals *g* fitted to the boxes *d* in the frame *b*, the journals at one end projecting sufficiently to receive a crank, *h*, by which the machine is operated.

*i* is still another frame, made to overlap the bar *f'* of the frame *f*, and forming a bed or table, *m*, on which the metal plate *k* is placed previous to its being bent. The two frames *f* and *i* are secured together at *l*. Thus it will be seen that the bed or table *m* may, in its relation to the folding plate *e*, be readily adjusted by the set-screws *n* or their equivalents, so as to form a close or open lock. The two frames *f* and *i*, taken together, constitute what I have elsewhere in this specification called the "folding" bar.

Upon the hub or shoulders of the journals *g* are formed cams *o*, resting upon the friction-rollers *p*, which have their bearings in the bed *a*.

To operate this machine and form the locks in the metal (shown in Figs. 4 and 5) place the metal plate *k* on the table *m*, between the plate *e* and jaw *s* and against the gage *x* and turn the crank from right to left, so as to cause the bar $f'$ $i$ to make about one-half a revolution. To form a close or open lock, as shown in Figs. 4 and 5, adjust the frame $i$, by means of the set-screws $n$, so that when it is turned over upon the folding plate $e$ the table $m$ shall press more or less closely on said plate $e$, according as a close or open bend is desired. It will be clearly seen that motion on its axis being given to the folding bar (which is made up of the frames $f$ and $i$) the cams $o$ will clamp the edge of the metal-plate $k$ between the jaw $s$ of the frame $b$ and the folding plate $e$, and at the same time the folding bar will rise, with the jaw $s$, into such a position that it can be turned over on top of the plate $e$, thus forming the lock or bend of the plate. (Shown in Figs. 4 and 5.)

I am aware that a close lock, or one nearly so, may be formed by making the plate $m$ fixed, and not adjustable, the machine remaining in other respects substantially the same in its construction and operation. I do not wish, therefore, to limit myself to the adjustable feature exclusively, as that would deprive me of the benefit of an important part of my improvement.

I have carefully compared my improvement with the following patents—viz., Nos. 8,012, 13,046, 16,456, and others—and I do not wish to claim the device shown and claimed in either of them. Neither do I claim any of the parts shown in my improvement when separately considered.

What I do claim as my invention, and desire to secure by Letters Patent, is—

1. Making the folding bar commonly used in such machines in two parts, $f$ and $i$, one part, $i$, being adjustable in respect to the folding plate $e$ by means of set-screws $n$, or other equivalent means, so as to form a close or open lock for joining two pieces of metal plate or closing around a wire, substantially in the manner as described.

2. Arranging the gripping-jaw $s$ with the folding bar $f$ and $i$ in such a manner that on motion being given to the folding bar $f$ on its axis $g$ the gripping-jaw $s$ is made to close on the folding plate $e$ and at the same time carry along with it the folding bar $f$ into such a position as will bring its axis $g$ of motion nearly into a line with the edge of the folding plate $e$, thereby placing the folding plate $f$ and $i$ in position to be turned over onto the folding plate $e$, necessarily and simultaneously with the motion of the folding bar $f$ and $i$ on its axis $g$, substantially in the manner as described.

3. The bed-plate proper, $a$ $a'$, to which is secured the folding plate $e$, in combination with the hinged frame $b$, having journal-boxes $d$ and gripping-jaws $s$, the folding bar $f$ and $i$, having journals $g$, and cams $o$, arranged and operating together, substantially in the manner as and for the purpose described.

4. In a machine which uses but one folding bar, as described, the combination of the folding plate with the folding bar, when so constructed and operating together that the distance between their adjacent edges can be increased or diminished at pleasure for the purpose of forming both open and close locks or bends in sheet metal.

ORSON W. STOW.

Witnesses:
F. F. VANDUSEN,
STEPHEN WALKLEY.